3,709,956
POLYESTER-SILOXANE PAINT
John D. Nordstrom, Detroit, Mich., assignor to
Ford Motor Company, Dearborn, Mich.
No Drawing. Original application Nov. 18, 1968, Ser. No. 776,780, now Patent No. 3,577,262. Divided and this application Dec. 17, 1970, Ser. No. 99,247
Int. Cl. C08f 21/00
U.S. Cl. 260—827    15 Claims

ABSTRACT OF THE DISCLOSURE

A radiation-curable paint is provided by mixing an alpha-beta olefinically unsaturated polyester resin and an alpha-beta olefinically unsaturated siloxane. The resin may be any alpha-beta olefinically unsaturated polyester having between about 0.5 and about 5 units of alpha-beta olefinic unsaturation per 1,000 units molecular weight. Both maleic type and acrylic type unsaturation are illustrated. In one embodiment, the polyester is the common, conventional polyester formed from maleic anhydride, a glycol, and ring type anhydride, e.g., phthalic anhydride, a glycol, and an aromatic or saturated anhydride, e.g., phthalic anhydride, tetrahydrophthalic anhydride, etc. In another embodiment, a saturated polyester is reacted with a diisocyanate and the product reacted with a hydroxyalkyl acrylate. In another embodiment, the polyester is a siloxane-modified polyester.

The unsaturated siloxane component is the reaction product of at least two molar parts of a monomeric, monohydroxy ester of an alpha-beta olefinically unsaturated monocarboxylic acid, e.g., acrylates, methacrylates, crotonates, cinnamates, with one molar part of a siloxane having at least two silicon atoms with one valence satisfied by a hydroxyl group or an alkoxy group. The reaction is a conventional condensation reaction. Vinyl monomers may also be included in the paint dispersion.

---

This application is a division of application Ser. No. 776,780, filed Nov. 18, 1968, now U.S. Pat. 3,577,262.

This invention relates to the art of coating and is concerned with paint and painted articles of manufacture wherein the painted surface has high resistance to weathering. This invention is particularly concerned with articles of manufacture having external surfaces of wood, metal or polymeric solid coated with an in situ formed polymerization product of a radiation-curable paint binder crosslinked on said surface by ionizing radiation and comprising a film-forming solution of an alpha-beta olefinically unsaturated polyester and an alpha-beta olefinically unsaturated polysiloxane, the reaction product of one molar part siloxane having at least two hydroxyl and/or hydrocarbonoxy groups and, preferably at least two molar parts of, a hydroxyl bearing ester of an alpha-beta unsaturated carboxylic acid. In a preferred embodiment, the film-forming solution also contains vinyl monomers.

In this application, the term "paint" is meant to include pigment and/or finely ground filler, the binder without pigment and/or filler or having very little of the same, which can be tinted if desired. Thus, the binder which is ultimately converted to a durable film resistant to weathering, can be all or virtually all that is used to form the film, or it can be a vehicle for pigment and/or particulate filler material.

The siloxanes employed in the preparation of the binder have a reactive hydroxyl or hydrocarbonoxy group bonded to at least two of its silicon atoms. The term "siloxane" as employed herein refers to a compound containing a

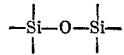

linkage, with the remaining valences being satisfied by a hydrocarbon radical, a hydrocarbonoxy group, hydrogen, a hydroxyl group, or an oxygen atom which interconnects the silicon atom providing such valence with another silicon atom.

A variety of methods are known to the art for preparing siloxanes. These include controlled hydrolysis of silanes, polymerization of a lower molecular weight siloxane, reacting silicon tetrachloride with an alcohol, etc. The preparation of siloxanes and their incorporation into organic resins is disclosed in U.S. Pats. 3,154,597; 3,074,904; 3,044,980; 3,044,979; 3,015,637; 2,996,479; 2,973,287; 2,937,230; and 2,909,549.

The hydroxyl bearing ester is preferably a monohydroxy alkyl ester of an alpha-beta olefinically unsaturated monocarboxylic acid. The preferred hydroxy esters are acrylates and methacrylates in that they provide olefinic unsaturation between the terminal carbon atoms and are readily polymerizable at relatively low doses of ionizing radiation. A partial and exemplary list of such acrylates follows:

2-hydroxyethyl acrylate or methacrylate
2-hydroxypropyl acrylate or methacrylate
2-hydroxybutyl acrylate or methacrlate
2-hydroxyoctyl acrylate or methacrylate
2-hydroxydodecanyl acrylate or methacrylate
2-hydroxy-3-chloropropyl acrylate or methacrylate
2-hydroxy-3-acryloxypropyl acrylate or methacrylate
2-hydroxy-3-methacryloxypropyl acrylate or methacrylate
2-hydroxy-3-allyloxypropyl acrylate or methacrylate
2-hydroxy-3-cinnamylpropyl acrylate or methacrylate
2-hydroxy-3-phenoxypropyl acrylate or methacrylate
2-hydroxy-3-(o-chlorophenoxy) propyl acrylate or methacrylate
2-hydroxy-3-(p-chlorophenoxy) propyl acrylate or methacrylate
2-hydroxy-3-(2,4-dichlorophenoxy) propyl acrylate or methacrylate
2-hydroxy-3-acetoxypropyl acrylate or methacrylate
2-hydroxy-3-propionoxypropyl acrylate or methacrylate
2-hydroxy-3-chloroacetoxypropyl acrylate or methacrylate
2-hydroxy-3-dichloroacetoxypropyl acrylate or methacrylate
2-hydroxy-3-trichloroacetoxypropyl acrylate or methacrylate
2-hydroxy-3-benzoxypropyl acrylate or methacrylate
2-hydroxy-3-(o-chlorobenzoxy) propyl acrylate or methacrylate
2-hydroxy-3-(2,4-dichlorobenzoxy) propyl acrylate or methacrylate
2-hydroxy-3-(3,4-dichlorobenzoxy) propyl acrylate or methacrylate
2-hydroxvy-3-(2,4,6-trichlorophenoxy) propyl acrylate or methacrylate
2-hydroxy-3-(2,4,5-trichlorophenoxy) propyl acrylate or methacrylate
2-hydroxy-3-(o-chlorophenoxyacetoxy) propyl acrylate or methacrylate
2-hydroxy-3-phenoxyacetoxypropyl acrylate or
2-hydroxy-3-(p-chlorophenoxyacetoxy) propyl acrylate or methacrylate
2-hydroxy-3-(2,4-dichlorophenoxyacetoxy) propyl acrylate or methacrylate
2-hydroxy-3-(2,4,5-trichlorophenoxyacetoxy) propyl acrylate or methacrylate
2-hydroxy-3-crotonoxypropyl acrylate or methacrylate
2-hydroxy-3-cinnamyloxypropyl acrylate or methacrylate
3-acryloxy-2-hydroxypropyl acrylate or methacrylate
3-allyloxy-2-hydroxypropyl acrylate or methacrylate 3-chloro-2-hydroxypropyl acrylate or methacrylate
3-crotonoxy-2-hydroxypropyl acrylate or methacrylate In addition to acrylates and methacrylates one may also use cinnamates, crotonates, etc.

The term "ionizing radiation" as employed herein means radiation having sufficient energy to effect polymerization of the paint films herein disclosed, i.e. energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitted and the workpiece where the intervening space is occupied by air. Adjustment can be made for the relative resistance of the intervening gas which is preferably an oxygen-free inert gas such as nitrogen or helium. I prefer to employ an electron beam which at its source of emission has average energy in the range of about 150,000 to about 500,000 electron volts.

The films formed from the paints of this invention are advantageously cured at relatively low temperatures, e.g. between room temperature (20° to 25° C.) and the temperature at which significant vaporization of its most volatile component is initiated, ordinarily between 20° and 70° C. The radiation energy is applied at dose rates of about 0.1 to about 100 mrad per second upon a preferably moving workpiece with the coating receiving a total dose in the range of about 0.5 to about 100, ordinarily between about 1 and about 25, and most commonly between 5 and 15 mrad. The films can be converted by the electron beam into tenaciously bound, wear and weather resistant, coatings.

The abbreviation "mrad" as employed herein means 1,000,000 rad. The term "rad" as employed herein means that dose of radiation which results in the absorption of 100 ergs of energy per gram of absorber, e.g. coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛ inch in diameter at this point, is then scanned to make a fan-shaped beam and then passed through a metal window, e.g. a magnesium-thorium alloy, aluminum, an alloy of aluminum, and a minor amount of copper, etc., of about 0.003 inch thickness.

The term "vinyl monomers" as used herein refers to a monomeric compound having a

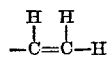

or

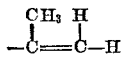

terminal group and excludes allylic compounds. The preferred vinyl monomers are esters of $C_1$ to $C_8$ monohydric alcohols and acrylic or methacrylic acid, e.g. ethyl acrylate, ethyl methacrylate, butyl acrylate, butyl methacrylate, octyl acrylate, 2-ethyl hexyl acrylate, etc. Alcohols of higher carbon number, e.g. $C_9$–$C_{15}$, can also be used to prepare such acrylates and methacrylates. Vinyl hydrocarbon monomers, e.g. styrene and alkylated styrenes such as vinyl toluene, alpha-methyl styrene, etc., may be used separately or in combination with acrylates and methacrylates. Also in combination with acrylates and methacrylates and/or vinyl hydrocarbon monomers, there may be used minor amounts of other vinyl monomers such as nitriles, e.g. acrylonitrile, acrylamide, N-methylol acrylonitrile, vinyl halides, e.g. vinyl chloride, and vinyl carboxylates, e.g. vinyl acetate.

The alpha-beta olefinically unsaturated polyester has a molecular weight in the range of about 500 to about 20,000, preferably in the range of about 2,000 to about 10,000. The polyester advantageously has about 0.5 to about 5, preferably about 1 to about 3.5, units of alpha-beta olefinic unsaturation per 1,000 units molecular weight.

Among the unmodified polyester resin, i.e. those consisting essentially of carbon, hydrogen and oxygen atoms, the preferred resins are formed from a polyhydric alcohol, an alpha-beta olefinically unsaturated dicarboxylic acid and a second multicarboxylic acid. The term "alpha-beta olefinic unsaturation" as employed herein includes the radition sensitive olefinic unsaturation resulting from the incorporation of maleic acid, or other acid of equivalent unsaturation for purposes of radiation polymerization, into the polyester.

The preferred dicarboxylic acid for providing the desired alpha-beta olefinic unsaturation is maleic acid which is preferably employed in the form of its anhydride. Other acids and/or anhydrides that can be used for this purpose include, but not by way of limitation, fumaric itaconic, chloromaleic, dichloromaleic, etc.

The second multicarboxylic acid, i.e. dicarboxylic or tricarboxylic acid, is selected from acids that will not provide additional alpha-beta olefinic unsaturation units and the relative quantities of the two acids are adjusted to provide the desired concentration of such unsaturation in the form of its anhydride. Suitable anhydrides for this purpose include phthalic, tetrahydrophalic, 1,2,4-benzene tricarboxylic (trimellitic), etc.

The polyhydric alcohol is preferably a diol. Triols and other multihydric alcohols can be used but it is advisable to employ such alcohols in minor amounts with a diol. Suitable diols include, but not by way of limitation, ethylene glycol, propylene glycol, 1,3-butylene glycol, 2-butene-1,4-diol, 1,4-butane glycol, neopentyl glycol, 1,5-pentamethylene glycol, 1,6-hexamethylene glycol, decamethylene glycol, dimethylol benzenes, dihydroxy ethyl benzenes, etc. Multihydric alcohols include, but not by way of limitation, glycerol, pentaerythritol, etc.

The film-forming material should have an application viscosity low enough to permit rapid application to the substrate in substantially even depth and high enough so that at least 1 mil (.001 inch) film will hold upon a vertical surface without sagging. Such films will ordinarily be applied to an average depth of about 0.1 to 4 mils with appropriate adjustment in viscosity and application technique. It will be obvious to those skilled in the art that the choice of siloxane and of hydroxy esters in preparing the alpha-beta olefinically unsaturated siloxane component of the binder solution can be varied so as to vary the viscosity of the siloxane component. The molecular weight of the polyester may also be varied to control the viscosity of the binder solution. Also, the type and quantity of vinyl monomers in the binder solution are easily adjusted to provide a proper consistency for application by conventional paint application techniques, e.g. spraying, roll coating, etc. It is also within the scope of this invention to apply the polyester and the siloxane-unsaturated ester as the sole polymerizable components of the binder in solution with a volatile solvent, e.g. toluene, xylene, etc., which can be flashed off after application.

Where the binder consists essentially of the alpha-beta olefinically unsaturated polyester and the alpha-beta olefinically unsaturated polysiloxane, the binder contains about 20 to about 80), advantageously about 30 to about 70, parts by weight of the polyester and about 20 to about 80, advantageously about 30 to about 80, parts by weight of the siloxane.

Where the binder contains significant amounts of vinyl monomers, the binder will advantageously contain about 10 to about 200, preferably about 20 to about 100, parts by weight vinyl monomers and a resinous component that comprises about 30 to 70 parts by weight of the polyester and about 30 to about 70 parts by weight of the siloxane. Minor amounts of other polymerizable monomers, e.g. allylic compounds, may be used to make up the balance, if any. This invention is particularly concerned with those coatings wherein the film-forming solution, exclusive of vinyl monomers, consists essentially of the unsaturated polyester and the siloxane-unsaturated ester product, herein defined to mean coating compositions wherein these components constitute at least 85 wt. percent of the film-forming binder.

This invention will be more fully understood from the following illustrative examples:

EXAMPLE 1

A siloxane-unsaturated ester and polyester paint is prepared from the following components in the manner hereinafter set forth:

(a) Preparation of the siloxane component

| Reactants | Parts by wt. |
|---|---|
| Methoxy functional acyclic siloxane [1] | 178 |
| Hydroxyethyl methacrylate | 118 |
| Tetraisopropyl titanate | 0.32 |
| Hydroquinone | 0.06 |

[1] A commercially available methoxylated partial hydrolysate of monophenyl and phenylmethyl silanes (largely condensed dimethyltripheyltrimethoxytrisiloxane) and has the following typical properties:

| | |
|---|---|
| Average molecular weight | 750–850 |
| Average number of silicon atoms per molecule | 5–6 |
| Average number of methoxy groups per molecule | 3–4 |

The siloxane, the methacrylate monomer and hydroquinone polymerization inhibitor are heated to 100° C. in a flask fitted with a Barrett type distillation receiver. The titanate catalyst is added and the temperature is raised to 150° C. over a three hour period during which time methanol is removed by distillation. The cooled reaction product has a viscosity of 0.6 stoke at 25° C.

(b) Preparation of the polyester resin

The resin contains about 1.5 units of alpha-beta olefinic unsaturation per 1,000 units molecular weight.

| Starting materials: | Parts by wt. |
|---|---|
| Maleic anhydride | 147 |
| Phthalic anhydride | 429 |
| Neopentyl glycol | 503 |

Procedure: All of the reactants are charged to a four neck flask fitted with a stirrer, a thermometer, a nitrogen inlet tube and a ten inch vigreux column topped with a Barrett trap for removing the water of condensation. The reactants are slowly heated to 165° C. at which time the first water of condensation distills off. Nitrogen is bubbled through the reactants throughout the reaction. The reaction temperature rises as water is continually removed until a maximum temperature of 225° C. is attained. The column is then removed from the system, 3 wt. percent xylene is added to aid azeotropic water removal and heating is continued until the acid number reaches 30. The product is cooled to 100° C. and 0.03 wt. percent hydroquinone inhibitor is added and the polymer diluted to 80% non-volatile content with styrene.

(c) Binder solution

| | Parts by wt. |
|---|---|
| Siloxane-ester product of (a) above | 10 |
| Polyester resin of (b) above | 12.5 |
| Methyl methacrylate | 5 |

The binder solution is spread on metal panels with a #30 wire wound rod and cured under the following conditions:

Electron beam potential: 270 kv.
Current: 25 ma.
Dose: 15 mrad.
Atmosphere: $N^2$.

The films thus prepared exhibited the following properties:

| | 1 | 2 |
|---|---|---|
| Film thickness (mil) | 1.6 | 1.1 |
| Pencil hardness | H | H |
| Solvent resistance [a] | 6 | 15 |

[a] Hand rubs with a soft rag soaked in 2-butanone.

EXAMPLE 2

The procedure of Example 1 is repeated except for the difference that the polyester component is prepared in the following manner from the following ingredients:

| Reactants: | Parts by wt. |
|---|---|
| Maleic anhydride | 14.7 |
| Tetrahydrophthalic anhydride | 72.3 |
| Neopentyl glycol | 75.0 |
| Dibutyl tin oxide, catalyst | 7.06 |

Procedure: To a reaction vessel, the reactants are charged and then heated to about 340° F. and held at this temperature for 1 hour. The temperature of the charge is then raised to 440° F. and maintained at such temperature until the acid number of the resulting resin is below about 20. The excess glycol and water are removed by vacuum and when the acid number is below about 10, there are added 14.5 grams hydroquinone. The charge is allowed to cool to about 180° F. and there is added 37.0 parts by weight styrene.

EXAMPLE 3

The procedure of Example 2 is repeated except that an equivalent amount of 1,2-cyclohexene dicarboxylic anhydride is substituted for the tetrahydrophthalic anhydride (4-cyclohexene-1,2-dicarboxylic anhydride).

EXAMPLE 4

The procedure of Example 2 is repeated except that an equivalent amount of trimellitic anhydride is substituted for the tetrahydrophthalic anhydride.

EXAMPLE 5

The procedure of Example 2 is repeated except that one fifth of the neopentyl glycol is replaced with an equivalent amount of pentaerythritol.

EXAMPLE 6

The procedure of Example 2 is repeated except that an equivalent amount of ethylene glycol is substituted for the neopentyl glycol.

EXAMPLE 7

The procedure of Example 2 is repeated except that an equivalent amount of 2-butene-1,4 diol glycol is substituted for the neopentyl glycol.

EXAMPLE 8

The procedure of Example 2 is repeated except that an equivalent amount of 1,6-hexamethylene glycol is substituted for the neopentyl glycol.

EXAMPLE 9

The procedure of Example 2 is repeated except that an equivalent amount of fumaric acid is substituted for the maleic anhydride.

EXAMPLE 10

The procedure of Example 2 is repeated except that an equivalent amount of chloromaleic anhydride is substituted for the maleic anhydride.

EXAMPLE 11

The procedure of Example 1 is repeated except for the difference that the polyester component is prepared in the following manner from the following ingredients:

| Reactants: | Parts by wt. |
|---|---|
| Maleic anhydride | 353.0 |
| Tetrahydrophthalic anhydride | 973.8 |
| Neopentyl glycol | 1458.1 |

Procedure: A fusion cook of the tetrahydrophthalic anhydride and neopentyl glycol is carried out over a 23-hour period. Water comes over at 165° C. and a maximum temperature of 180° C. is recorded. The resulting resin has an acid number of below 15 and is cooled to room temperature after which the maleic anhydride is added with 1.39 parts by weight hydroquinone and 330 cc. xylene. The charge is heated to an acid number of 10 with water coming over at about 140° C. and a maximum temperature of 180° recorded.

EXAMPLE 12

The procedure of Example 1 is repeated except that the polysiloxane is a methoxylated partial hydrolysate of monophenyl and phenylmethyl silanes consisting essentially of dimethyltriphenyltrimethoxytrisiloxane and has the following typical properties:

| | |
|---|---|
| Average molecular weight | 470 |
| Combining weight | 155 |
| Specific gravity at 77° F. | 1.105 |
| Viscosity at 77° F., centistokes | 13 |

EXAMPLE 13

A siloxane-unsaturated ester coating material is prepared from the following components in the manner hereinafter set forth:

Reactants (parts by wt.):

| | |
|---|---|
| Hydroxy functional cyclic siloxane [1] | 200 |
| Hydroxyethyl methacrylate | 71 |
| Hydroquinone | 0.1 |
| Xylene, solvent | 116 |

At 60% solids in xylene:

| | |
|---|---|
| Specific gravity at 77° F. | 1.075 |
| Viscosity at 77° F., centipoises | 33 |
| Gardner-Holdt | A-1 |

[1] A commercially available hydroxy functional, cyclic polysiloxane having the following typical properties:
Hydroxy content, Dean Stark:
  Percent condensible _____ 5.5
  Percent free _____ 0.5
Average molecular weight _____ 1600
Combining weight _____ 400
Refractive index _____ 1.531–1.539
Softening point, Durran's Mercury Method, degrees F. _____ 200

Procedure: A three-neck flask fitted with a stirring motor, a thermometer, a nitrogen inlet and a Barrett trap is charged with the siloxane, the methacrylate, the xylene and the hydroquinone. This solution is heated to reflux, 138° C., over a 30 minute period. Nitrogen is bubbled into the reaction throughout the whole procedure. By-product water is slowly removed and the temperature gradually rises to 146° C. After 5 hours, 8.5 ml. of water is collected indicating nearly complete reaction. The xylene is removed by reduced pressure distillation and the product is then diluted to 70 percent non-volatile content with methyl methacrylate. One hundred parts by weight of this solution and 30 parts by weight of the polyester prepared in Example 1 are admixed to form a first paint binder. One hundred parts by weight of this solution and 70 parts by weight of the polyester prepared in Example 1 are admixed to form a second paint binder. These coatings are pigmented and applied to metal, wood, and polymeric (ABS - acrylonitrile - butadiene-styrene copolymer) substrates and cured thereon with an electron beam as in the preceding examples using a dose of about 20 mrad.

EXAMPLE 14

The procedures of Examples 1, 12 and 13 are repeated except that an equivalent amount of 2 - hydroxy-ethyl acrylate is substituted for the hydroxyethyl methacrylate in preparing the siloxane-unsaturated ester product.

EXAMPLE 15

The procedures of Examples 1, 12 and 13 are repeated except that an equivalent amount of 2-hydroxypropyl methacrylate is substituted for the hydroxyethyl methacrylate in preparing the siloxane-unsaturated ester product.

EXAMPLE 16

The procedures of Examples 1, 12 and 13 are repeated except that an equivalent amount of 2 - hydroxy-butyl acrylate is substituted for the hydroxyethyl methacrylate in preparing the siloxane-unsaturated ester product.

EXAMPLE 17

The procedures of Examples 1, 12 and 13 are repeated except that an equivalent amount of 2 - hydroxy-octyl acrylate is substituted for the hydroxyethyl methacrylate in preparing the siloxane-unsaturated ester product.

EXAMPLE 18

The procedures of Examples 1, 12 and 13 are repeated except that an equivalent amount of 2 - hydroxydodecanyl methacrylate is substituted for the hydroxyethyl methacrylate in preparing the siloxane-unsaturated ester product.

EXAMPLE 19

The procedures of Examples 1, 12 and 13 are repeated except that an equivalent amount of 3-chloro-2-hydroxypropyl acrylate is substituted for the hydroxyethyl methacrylate in preparing the siloxane-unsaturated ester product.

EXAMPLE 20

The procedures of Examples 1, 12 and 13 are repeated except that an equivalent amount of 3-acryloxy-2-hydroxypropyl methacrylate is substituted for the hydroxy-ethyl methacrylate in preparing the siloxane-unsaturated ester product.

EXAMPLE 21

The procedures of Examples 1, 12 and 13 are repeated except that an equivalent amount of 3-crotonoxy-2-hydroxypropyl acrylate is substituted for the hydroxy-ethyl methacrylate in preparing the siloxane-unsaturated ester product.

EXAMPLE 22

The procedures of Examples 1, 12 and 13 are repeated except that an equivalent amount of 3-acryloxy-2-hydroxypropyl cinnamate is substituted for the hydroxy-ethyl methacrylate in preparing the siloxane-unsaturated ester product.

EXAMPLE 23

The procedures of Examples 1, 12 and 13 are repeated except that an equivalent amount of 3-acryloxy-2-hydroxypropylcrotonate is substituted for the hydroxy-ethyl methacrylate in preparing the siloxane-unsaturated ester product.

EXAMPLE 24

The procedures of Examples 14–23 are repeated using an amount of the monohydroxy ester of an alpha-beta olefinically unsaturated monocarboxylic acid that is sufficient to react with at least one hydroxy or hydrocarbonoxy functional group of the siloxane but insufficient to react with all of such functional groups of the siloxane molecules in the reaction mixture.

EXAMPLE 25

The procedure of Examples 14–23 are repeated using an amount of the monohydroxy ester of an alpha-beta olefinically unsaturated monocarboxylic acid that is in excess of the amount required to satisfy all of the hydroxy and hydrocarbonoxy functional groups of the siloxane molecules in the reaction mixture.

EXAMPLE 26

The procedure of Example 1 is repeated except that the polysiloxane employed to produce the alpha-beta olefinically unsaturated siloxane is dipropoxytetramethylcyclotrisiloxane.

EXAMPLE 27

The procedure of Example 1 is repeated except that the the polysiloxane employed to produce the alpha-beta olefinically unsaturated siloxane is dibutoxytetramethyldisiloxane.

EXAMPLE 28

The procedure of Example 1 is repeated except that the polysiloxane employed to produce the alpha-beta olefinically unsaturated siloxane is pentamethyltrimethoxytrisiloxane.

EXAMPLE 29

A pigmented paint is prepared by premixing 75 parts by weight of the siloxane-unsaturated ester product of Example 12 with 150 parts by weight of commercial grade titanium dioxide pigment and 20 parts by weight of methyl methacrylate. The mixture is ground by shaking with an equal amount of glass beads in a conventional paint shaker for 30 minutes. The premix is diluted with an additional 75 parts by weight of the siloxane-unsaturated ester product and 65 parts by weight of the resultant mix are diluted with 35 parts by weight of an equimolar mixture of styrene and methyl methacrylate. This mix is added to 35 parts methyl methacrylate and 65 parts by weight of the polyester of Example 1. The paint is applied to metal, wood and polymeric (ABS-acrylonitrile-butadiene-styrene copolymer) substrates to an average depth of about 1.5 mils and cured thereon with an electron beam in the manner of the previous examples.

EXAMPLE 30

A paint is prepared from a diisocyanate modified polyester and a siloxane-unsaturated ester in the following manner:

(a) Preparation of Polyester A

| Reactants: | Parts by wt. |
|---|---|
| Succinic acid | 340.1 |
| Tetrahydrophthalic anhydride | 1387.6 |
| 1,2-propanediol | 1004.4 |

The monomers with 200 cc. xylene are subjected to a solvent cook over a period of 10 hours gradually raising the temperature to 260° C. The resultant resin has an acid number of about 5.7. The xylene is separated from the resin.

(b) Preparation of Polyester B

| Reactants: | Parts by wt. |
|---|---|
| Resin A | 200 |
| Tolylene diisocyanate | 17.4 |
| Styrene | 86 |

The diisocyanate is added slowly and incrementally to the styrene-Resin A solution and the charge is continuously stirred over a period of 5.5 hours to form Resin B.

(c) Preparation of Polyester C

To the reatcion mix containing Resin B there is added 13 parts by weight of 2-hydroxyethyl methacrylate is added slowly and incrementally and the charge is continuously stirred over a period of 25 hours to form Resin C.

(d) Formulation of Paint

| Components: | Parts by wt. |
|---|---|
| Resin C Solution | 55 |
| Siloxane-unsaturated ester of Example 1(a) | 35 |

This paint is applied to a substrate with a wire wound rod and cured with an electron beam. The above formulation is diluted with 10, 25 and 50 parts by weight methyl methacrylate respectively. The resultant coatings are applied to substrates and cured by an electron beam in the manner of the preceding examples.

EXAMPLE 31

A siloxane-modified paint is prepared from the following components:

| Components: | Parts by wt. |
|---|---|
| Siloxane-unsaturated ester of Example 1(a) | 25 |
| Siloxane-modified polyester solution [1] | 75 |

[1] The siloxane-modified polyester vinyl monomer solution is prepared in the following manner: To a reaction vessel are charged 70 parts by weight of neopentyl glycol, 10 parts by weight xylene, and 35 parts by weight of the hydroxy-functional, cyclic, polysiloxane used in Example 13. The charge is heated to about 345° F. (174° C.) for 2.5 hours, after which there is added 13.7 parts by weight maleic anhydride, 54.2 parts by weight of tetrahydrophthalic anhydride and .22 part by weight of dibutyl tin oxide. The temperature of the charge is raised slowly to about 430° F. (221° C.) and this temperature is maintained until the resulting resin has an acid number of about 10. Some of the xylene and water of reaction are removed during the cook and the excess is then removed by vacuum. To the charge is added 0.027 part by weight hydroquinone and the charge is cooled to 180° F. (82.5° C.) and diluted with 40 parts by weight styrene.

The paint is applied to a substrate and cured with an electron beam as in the preceding examples.

EXAMPLE 32

The procedure of Example 1 is repeated except that curing is effected with a beam potential of 175,000 volts with the workpiece 3 inches from the emitter and at 400,000 volts at 10 inches each being in a nitrogen atmosphere containing minor amounts of carbon dioxide.

EXAMPLE 33

The siloxane-unsaturated ester of Examples 1, 12 and 13 each employed in combination with the polyester resins of Examples 1 and 2 are reduced to spraying consistency with xylene. These solutions are applied to substrates of wood, metal and synthetic solid polymer and cured as in the preceding examples after flashing off the xylene.

EXAMPLE 34

Paints are prepared by admixing 160 parts by weight of the siloxane-unsaturated ester product of Example 1 and 160 parts by weight of the polyester resin of Example 1, dividing this mix into two equal parts, and diluting one such part with 100 parts by weight methyl methacrylate and the other part with 200 parts by weight methyl methacrylate. The resultant film-forming solutions are applied to metal substrates and crosslinked thereon with an electron beam in the manner of the preceding examples.

EXAMPLE 35

Paints are prepared by admixing 40 parts by weight of the siloxane-unsaturated ester product of Example 13 and 40 parts by weight of the polyester resin of Example 2, dividing this mix into equal parts, and diluting one such part with 10 parts by weight methyl methacrylate and the other part with 20 parts by weight methyl methacrylate. The resultant film-forming solutions are applied to metal substrates and crosslinked thereon with an electron beam in the manner of the preceding examples.

A variety of suitable siloxanes for use in this invention are described and illustrated in detail in my parent co-pending application Ser. No. 776,780 filed Nov. 18, 1968 and the disclosures thereof are incorporated herein by reference.

It will be understood by those skilled in the art that modifications can be made within the foregoing examples within the scope of the invention as hereinafter claimed.

I claim:

1. A radiation-curable paint which on a pigment and particulate filler-free basis consists essentially of
   (1) about 20 to about 80 parts by weight of an alpha-beta olefinically unsaturated polyester
      (a) consisting essentially of carbon, hydrogen and oxygen,
      (b) having molecular weight in the range of about 2,000 to about 10,000, and
      (c) having about 0.5 to about 3.5 units of alpha-beta olefinic unsaturation per 1,000 units molecular weight, and
   (2) about 20 to about 80 parts by weight of an alpha-beta olefinically unsaturated siloxane formed by reacting at an etherification reaction temperature a siloxane having at least two functional groups selected from hydroxyl groups and $C_1$–$C_4$ alkoxy groups with a monohydroxy alkyl ester of an alpha-beta olefinically unsaturated monocarboxylic acid.

2. A radiation-curable paint in accordance with claim 1 wherein said monohydroxy ester of an alpha-beta olefinically unsaturated monocarboxylic acid is an ester of acrylic or methacrylic acid and a $C_2$–$C_8$ dihydric alcohol.

3. A radiation-curable paint in accordance with claim 1 wherein said monohydroxy ester of an alpha-beta olefinically unsaturated monocarboxylic acid is an ester of crotonic acid and a $C_2$–$C_8$ dihydric alcohol.

4. A radiation-curable paint in accordance with claim 1 wherein said monohydroxy ester of an alpha-beta olefinicaly unsaturated monocarboxylic acid is an ester of cinnamic acid and a $C_2$–$C_8$ dihydric alcohol.

5. A radiation-curable paint in accordance with claim 1 wherein said siloxane is a $Si_3$–$Si_{12}$ siloxane.

6. A radiation-curable paint in accordance with claim 1 wherein said alkoxy group is a methoxy group.

7. A radiation-curable paint in accordance with claim 1 wherein said polyester has between about 0.5 and 3.5 units of alpha-beta olefinic unsaturation per 1,000 units molecular weight.

8. A radiation-curable paint in accordance with claim 1 wherein said polyester has between about 1 and 3.5 units of alpha-beta olefinic unsaturation per 1,000 units of molecular weight.

9. A radiation-curable paint which on a pigment and particulate filler-free basis consists essentially of
   (1) about 10 to about 200 parts by weight vinyl monomers selected from esters of acrylic or methacrylic acid and a $C_1$–$C_8$ monohydric alcohol and $C_8$–$C_9$ monovinyl hydrocarbons,
   (2) about 30 to about 70 parts by weight of an alpha-beta olefinically unsaturated polyester
      (a) consisting essentially of carbon, hydrogen and oxygen,
      (b) having molecular weight in the range of about 2,000 to about 10,000 and
      (c) having about 0.5 to about 3.5 units of alpha-beta olefinic unsaturation per 1,000 units molecular weight, and
   (3) about 20 to about 80 parts by weight of an alpha-beta olefinically unsaturated siloxane formed by reacting at an etherification temperature a siloxane having at least two functional groups selected from hydroxyl groups and $C_1$–$C_4$ alkoxy groups with a monohydroxy alkyl ester of an alpha-beta olefinically unsaturated monocarboxylic acid.

10. A radiation-curable paint in accordance with claim 9 wherein said resin has between about 1 and about 3.5 units of alpha-beta olefinic unsaturation per 1,000 units molecular weight.

11. A radiation-curable paint in accordance with claim 9 wherein said monohydroxy ester of an alpha-beta olefinically unsaturated monocarboxylic acid is an ester of acrylic or methacrylic acid and a $C_2$–$C_8$ dihydric alcohol.

12. A radiation-curable paint in accordance with claim 1 wherein said monohydroxy ester of an alpha-beta olefinically unsaturated monocarboxylic acid is an ester of crotonic acid and a $C_2$–$C_8$ dihydric alcohol.

13. A radiation-curable paint in accordance with claim 9 wherein said monohydroxy ester of an alpha-beta olefinically unsaturated monocarboxylic acid is an ester of cinnamic acid and a $C_2$–$C_8$ dihydric alcohol.

14. A radiation-curable paint in accordance with claim 9 wherein said siloxane is a $Si_3$–$Si_{12}$ siloxane.

15. A radiation-curable paint in accordance with claim 9 wherein said alkoxy group is a methoxy group.

References Cited
UNITED STATES PATENTS

| | | | |
|---|---|---|---|
| 3,577,262 | 5/1971 | Nordstrom | 117—93.31 |
| 3,577,263 | 5/1971 | Nordstrom | 117—93.31 |
| 3,577,264 | 5/1971 | Nordstrom | 117—93.31 |

DONALD E. CZAJA, Primary Examiner

M. I. MARQUIS, Assistant Examiner

U.S. Cl. X.R.

117—93.31, 132 BS, 147, 161 UC, 161 ZA; 204—159.13, 159.15; 260—41 R, 46.5 UA, 77.5 CR